(No Model.)
V. BARKER & J. BARBOUR.
Cheese Knife.
No. 230,393.            Patented July 27, 1880.
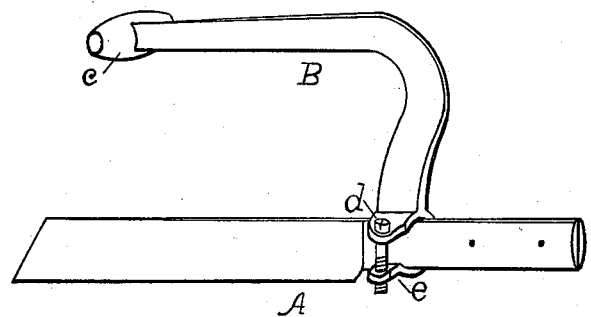
Witnesses;
Geo. M. Thomas,
Freeman Werriee
Inventors;
Volney Barker
John Barbour

UNITED STATES PATENT OFFICE.

VOLNEY BARKER, OF PORTLAND, MAINE, AND JOHN BARBOUR, OF HAVERHILL, MASSACHUSETTS.

CHEESE-KNIFE.

SPECIFICATION forming part of Letters Patent No. 230,393, dated July 27, 1880.

Application filed March 16, 1880. (No model.)

*To all whom it may concern:*

Be it known that we, VOLNEY BARKER, of Portland, in the county of Cumberland and State of Maine, and JOHN BARBOUR, of Haverhill, in the county of Essex and State of Massachusetts, have invented a new and useful Improvement in Cheese-Knives, of which the following is a specification.

Our invention relates to attachments applied to knives for cutting cheese or other similar substances, and is intended for the use of retail grocers, provision-dealers, and others having much of such work to do.

The usual method of cutting cheese in pieces for retail is to lay it flat-side down, and with the knife held in a horizontal position, edge downward, with its point at the center of the cheese, it is pressed down through. The knife being again placed in a position radially with the first and the operation repeated, a sector or wedge-shaped piece is removed.

To cut cheese with a common knife in this manner requires much exertion of strength, especially if the cheese is hard or thick, as after the blade of the knife has become embedded in the cheese the force can only be exerted at the handle, which being short, the strength of the hands is applied at a great disadvantage, and often a seesaw motion has to be imparted to the knife to compel it to advance. In this way more or less cheese is chipped off and wasted. Besides, it is very difficult to guide the knife and prevent it from turning aside from a direct course.

The object of our invention is to provide a more effective implement for the above-named purpose; and it consists in an attachment to be applied to the above-mentioned knife, so as to allow a more advantageous application of force to the blade while being used for said purpose, by which the cutting can be done with greater ease and facility, said attachment being so constructed that it can be readily detached and applied to other knives.

In the accompanying drawing, which is a perspective view, A represents an ordinary knife, such as is used by marketmen. B is a crooked arm or brace rigidly attached to the handle of said knife, at a point near its junction with the blade, in the manner hereinafter described, said arm or brace being so bent and affixed to the handle of the knife A as to stand in a position above and directly over the blade thereof and in a vertical plane with the latter. The brace B is bent or crooked in such a manner that while one portion is at about a right angle with the handle of the knife to which it is fastened the other part extends forward in a line parallel, or nearly so, with the blade, and at such height above it as to admit of the latter passing through the cheese or substance to be cut. The arm B is made tapering in form for the sake of proportion, and is provided at its extreme end with a handle, *c*, affixed crosswise, the position of said handle being over the end of the knife, so that a downward force upon the handle *c* will be equivalent to the same force applied directly to the point of the knife. It is not essential that the arm B be exactly of the shape and proportion shown in the drawing, as it may vary slightly without impairing its effectiveness. The end of the arm B, where it connects with the knife-handle, is curved or saddle-shaped to fit it, and is firmly attached thereto by means of screws *d*, there being one at each side, passing through corresponding projecting ears of the arm, and connecting with the strap or yoke-shaped piece *e*, which crosses beneath the handle, and is provided with a hole at each end, tapped to fit the screws.

As this arrangement is exactly the same on both sides of the knife-handle, it is deemed sufficient to show but one side in the drawing.

The arm or brace B may be quickly detached from or attached to any ordinary knife used for the purposes named, and does not materially interfere with the free use of the latter. Slight variations in the size of different handles are provided for by extra length of screws and the space between them; but it will be obvious to any mechanic that there are other effective methods of attachment, and we do not wish to limit ourselves to the particular one described.

In using our device it will be apparent that, with one hand grasping the knife-handle and the other applied to the handle *c*, a direct force can be exerted by both hands equally upon all parts of the blade, and the hardest cheese may be easily cut through smoothly and without crumbling it.

The implement can be used with advantage in cutting other substances of a like nature.

The attachable arm B is intended to be manufactured and sold either separately or with the knife attached.

Having thus described our invention, what we claim is—

The attachable brace B, provided with the binding-screws $d$ and yoke-piece $e$, or their equivalents, for rendering it adjustable to knife-handles of varying sizes, so as to constitute an auxiliary handle or brace for a knife, when applied and used substantially in the manner and for the purpose herein described and specified.

VOLNEY BARKER.
JOHN BARBOUR.

Witnesses:
GEO. M. THOMAS,
WILL. DURGIN.